3,009,964
PROCESS FOR PREPARATION OF
CALCIUM METHYLATE
Richard W. Russell, Fuengirola, Malaga, Spain, assignor to Ekco Products Company, Chicago, Ill., a corporation of Delaware
No Drawing. Filed Oct. 31, 1958, Ser. No. 770,947
2 Claims. (Cl. 260—632)

This invention relates to chemical processes for the preparation of calcium methylate.

The conventional method of preparing aliphatic alcoholates consists of contacting the particular metal directly with the alcohol. The chemical reaction involved in the formation of a metal alcoholate is $$M + ROH \rightarrow MOR + \tfrac{1}{2}H_2$$

wherein M=metal, R=alkyl radical. In other words, the hydrogen atom of the hydroxyl group of the alcohol is replaced by the metal under liberation of hydrogen. Metal alcoholates of nearly all of the alkali and alkaline earths metals have been known and used for many years. The majority of alkali and alkaline earth alcoholates— for example, sodium methylate, potassium methylate, magnesium methylate, as well as the ethylates of above metals—can easily be prepared by directly dissolving the respective metals in the alcohol. However, it is not possible to prepare calcium methylate by the simple route of directly contacting metallic calcium with methyl alcohol. When metallic calcium is placed in absolute methanol, no reaction occurs and, even by refluxing for prolonged periods, the metallic calcium remains unchanged and no gas evolution can be observed. This fact also explains the paucity of data concerning calcium methylate as a compound.

An extensive literature search has shown that calcium methylate can only be prepared by involved and costly methods, such as those described hereinafter:

(1) Sodium methylate and calcium nitrate in a liquid ammonia solution will react to form calcium methylate (calcium methoxide). Annales de Chemie et de Physique (9)—8, 171 (also abstracted in Comptes rendues de l'Academie de Sciences).

(2) Methanol and calcium—ammonium in liquid ammonia will also react—under formation of calcium methylate. Annales de Chemie et de Physique (9) 8, 171 (also abstracted in Comptes rendues de l'Academie de Sciences).

(3) Calcium hydride and methanol will react to form calcium methoxide and hydrogen. Williams and Truesdall J. Am. Chem. Soc. 45, 1350.

(4) Preparation of potassium alcoholates. Hanford U.S. Patent 2,451,945, issued October 19, 1948.

Laboratory tests have shown that a very slow formation of calcium methylate will take place by refluxing methanol in contact with calcium carbide. The Hanford patent referred to relates to the production of potassium alcoholates and more specifically covers the production of potassium methylate. In the Hanford process, calcium methylate is produced as an intermediate product by heating calcium carbide with methyl alcohol and is neither isolated nor described as a separate compound. Potassium methylate is formed when potassium carbonate is added to a slurry containing calcium methylate in excess methanol. The slow rate of formation of calcium methylate from calcium carbide and methyl alcohol appears sufficient since the addition of potassium carbonate upsets the chemical equilibrium because inert calcium carbonate will be precipitated thus allowing for the formation of more calcium methylate. In other words, only partial conversion of calcium carbide to calcium methylate at any given time is needed to keep the process going.

It can be readily seen that the above described methods of preparing calcium methylate are totally unsuitable for quantity production. For instance, the calcium hydrate used by Williams and Truesdall as a starting material was prepared by heating shavings of metallic calcium in a liquid bath at 340° C. in an atmosphere of hydrogen gas. The fact remains that calcium methylate has never been economically produced and isolated in large quantities.

I have discovered that calcium methylate can be readily produced when calcium metal or calcium carbide is contacted with either methanol vapor or with methanol liquid at or shortly after the time of condensation of methanol from the vapor phase. The process proceeds rapidly and affords economic production of large quantities of calcium methylate.

Accordingly an object of my invention is to provide a new method of producing calcium methylate.

Another object of my invention is to produce calcium methylate by a relatively inexpensive method.

Another object of my invention is to produce calcium methylate in high yields.

A further object of my invention is to provide a method of producing calcium methylate which is commercially acceptable.

A still further object of my invention is to produce calcium methylate of high purity.

A still further object of my invention is to produce calcium methylate in solid form.

Another object of my invention is to produce calcium methylate by reacting calcium metal or calcium carbide with methanol in the vapor phase or with freshly condensed methanol.

These and other important objects of the invention will be readily apparent as the description proceeds.

I have found that the reaction between metallic calcium and methanol can be initiated and brought to completion rather rapidly when calcium metal is contacted with either methanol vapor or with methanol liquid at or shortly after the moment of condensation from the vapor phase. I have also found that the same observation applies to the formation of calcium methylate from calcium carbide and methanol. While it is known that a slow reaction between calcium carbide and methanol can be brought about by refluxing the mixture for an extended period of time, I have confirmed that several days of refluxing are required for the reaction to go to completion. However, I have found that by contacting calcium carbide or calcium metal with methanol vapor or methanol freshly condensed from the vapor phase, calcium methylate is formed rapidly under evolution of acetylene gas.

At first glance, one might be led to believe that the only requirement for a rapid reaction to proceed is physical re-arrangement of the position of the reactants. I believe, however, that my observation is based on a physico-chemical phenomenon which is hereinafter discussed in greater detail.

Methanol in the liquid state, up to close to its boiling point, exists only as an associated molecule due to the existence of hydrogen bonding forces. In the case of methanol in contrast to high molecular weight alcohols, these bonding forces are particularly strong because one of the hydrogen atoms in the methyl group of $CH_3OH$ is more active than any hydrogen atom in a longer alkyl chain would be, such as in ethanol ($CH_3$—$CH_2$—OH). According to the literature, the bonding energy of the hydrogen atom in methyl alcohol is approximately 5K cal./mole. To state it in a somewhat different way, methanol, as the first member of a group of aliphatic mono-hydroxy compounds (aliphatic alcohols), comes the closest in molecular structure to water, as shown here:

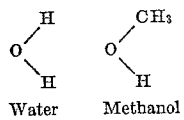

Water    Methanol and, therefore, approaches water in reactivity more closely than the higher alcohols with longer alkyl chains. This theory is further supported by the fact that calcium ethylate is well known and can be easily prepared by contacting calcium metal with anhydrous ethanol which has a smaller dipole moment than methanol and, for the same reason, can be expected to have a lower hydrogen bond energy. On the other hand, the fact that magnesium methylate can be dissolved in methanol at room temperature may be explained by the lesser tendency of magnesium to give off electrons in comparison to calcium.

Thus, for these reasons, the reaction of methanol in the vapor phase with calcium metal or calcium carbide will proceed rapidly to completion, since the molecules are dissociated. It is believed that on condensing methanol there is a time lag before the freshly condensed methanol molecules become associated again to the point where the reaction with calcium metal or calcium carbide will not proceed.

The invention is further illustrated by the following examples:

Example I 500 grams of methanol was placed in a 1000 ml. round bottom two neck flask. The center neck was closed by a stopper. The side neck was fitted to a soxhlet extractor. The soxhlet thimble was filled with 60 grams of granular calcium carbide. The alcohol was then brought to boil and, as soon as refluxing had started, the evolution of acetylene gas could be observed. After about two hours of refluxing, gas evolution had stopped and the contents of the soxhlet thimble had been converted to a white powdery solid. The white solid was removed from the soxhlet thimble and dried in the oven at 105° C. for about one hour. It represents a fine free flowing powder of snow white color which absorbs water from the atmosphere slowly. The conversion of calcium carbide to calcium methylate appears to be nearly quantitative. When ignited, calcium methylate burns with a pale blue almost colorless very hot flame leaving a white ash, consisting of calcium oxide.

Example II 40 grams of methanol was placed in a 1000 ml. round bottom two neck flask. The center neck was closed by a stopper. The side neck was fitted to a soxhlet extractor. The soxhlet thimble was filled with 40 grams of calcium metal. The alcohol was then brought to boil and, as soon as refluxing had started, the evolution of hydrogen could be observed. After about two hours of refluxing, gas evolution had stopped and the contents of the soxhlet thimble had been converted to a white powdery solid. No unreacted calcium metal was left in the thimble. The properties of the white powder were the same as that obtained in Example I.

The chemical composition of the described reaction product was determined by elemental analysis, which gave values for calcium, carbon and hydrogen closely approaching the formula

Calcium methylate appears to be absolutely stable when stored in a closed container and kept away from contact with moisture, which decomposes it under formation of calcium hydroxide and methanol. However, its rate of deterioration in contact with the atmosphere is rather slow, so that it could easily be handled with a reasonable amount of precaution.

Calicum methylate produced by the processes of this invention does not contain any free alkali or methanol.

While all the potential uses of calcium methylate are not presently known, since the material has not heretofore been available in sufficient quantity to warrant adequate investigation, it is believed that wide scale use of calcium methylate is possible. For example, it is believed that calcium methylate can be substituted in many reactions for sodium methylate which is now widely used in industry. It appears that the most immediate use for calcium methylate will be found in the field of pharmaceuticals, organic intermediates, perfumes, metallic soaps, dyestuffs, etc.

Thus it will be seen that I have discovered a commercially practical method or process of producing high purity calcium methylate in large quantity and with good yield.

Various modifications of the invention will occur to persons skilled in the art and I do not intend to be limited in the patent granted except as required by the prior art and the appended claims.

I claim:

1. The method of producing calcium methylate by reacting calcium carbide with methanol while separately heating said methanol and said methanol is undergoing condensation from a vapor phase.

2. The method of producing calcium methylate by reacting calcium metal with methanol while separately heating said methanol and said methanol is undergoing condensation from a vapor phase.

References Cited in the file of this patent

UNITED STATES PATENTS

| | | |
|---|---|---|
| 2,451,945 | Hanford | Oct. 19, 1948 |
| 2,715,057 | Pryde | Aug. 9, 1955 |